(12) United States Patent
Huisman et al.

(10) Patent No.: US 6,729,074 B1
(45) Date of Patent: May 4, 2004

(54) ASSEMBLY OF GUIDES AND SLIDING PANEL, AND SUNSHADE FOR APPLICATION THEREIN

(75) Inventors: Warren James Huisman, West Bloomfield, MI (US); Robert Scott Grace, Whitmore Lake, MI (US); Susan Jane Lindh, West Bloomfield, MI (US)

(73) Assignee: Inalfa Roof Systems Group B.V. (NL)

( * ) Notice: Subject to any disclaimer, the term of this patent is extended or adjusted under 35 U.S.C. 154(b) by 0 days.

(21) Appl. No.: 10/308,903

(22) Filed: Dec. 3, 2002

(51) Int. Cl.[7] .................................................. B60J 1/20
(52) U.S. Cl. .......................................... 49/413; 296/214
(58) Field of Search .................... 49/413, 415; 296/214

(56) References Cited

U.S. PATENT DOCUMENTS 3,691,686 A * 9/1972 Donegan ....................... 49/63
4,852,938 A * 8/1989 Hirshberg et al. .......... 296/214
6,012,767 A * 1/2000 Farmont ...................... 296/214
6,332,644 B1 * 12/2001 Ito et al. ..................... 296/215

FOREIGN PATENT DOCUMENTS

JP          61-282120       * 12/1986   ................. 296/214

* cited by examiner

*Primary Examiner*—Dennis H. Pedder
(74) *Attorney, Agent, or Firm*—Westman, Champlin & Kelly, P.A.; S. Koehler

(57) ABSTRACT

An assembly is provided having two opposing parallel guides and a panel having two opposite parallel lateral edges cooperating with said guides for a frictional sliding movement of the panel relative to the guides. The edges of the panel are resiliently curved such that there are defined three contact points between each edge and corresponding guide. In one embodiment, two contact points are near the ends of each edge and there is an intermediate contact point. The assembly may be provided in an open roof assembly for a vehicle.

8 Claims, 1 Drawing Sheet

ASSEMBLY OF GUIDES AND SLIDING PANEL, AND SUNSHADE FOR APPLICATION THEREIN

BACKGROUND OF THE INVENTION

The invention relates to an assembly of two opposing parallel guides and a panel having two opposite parallel lateral edges cooperating with said guides for a frictional sliding movement of the panel relative to the guides.

For obtaining a stable position and reproducible movement of the panel relative to the guides, a well-defined amount of friction should occur between the lateral edges and the guides. In a known assembly, the lateral edges are provided with slide shoes that are housed within the guides and cooperate therewith. It is a disadvantage of said slide shoes, however, that small dimensional variations (due to production tolerances) result in large variations of the frictional force and thus the sliding force of the panel.

It is an object of the present invention to provide an assembly as stated above, in which the influence of dimensional variations on the frictional forces is dramatically decreased.

SUMMARY OF THE INVENTION

Thus, in accordance with a first aspect of the present invention, there is provided an assembly of two opposing parallel guides and a panel having two opposite parallel lateral edges cooperating with said guides for a frictional sliding movement of the panel relative to the guides, wherein the said edges of the panel are resiliently curved or disposed in such a manner that there are defined three contact points between each edge and corresponding guide, i.e. two contact points near the ends of each edge and an intermediate contact point.

As a result of said curved edges of the panel with three distinct, spaced contact points at each edge that produce frictional forces and slide forces for the panel that do not or hardly vary with varying dimensions. But also variations in the shape of the panel (or the edges thereof) do not have a large influence on the resulting frictional forces. Thus, according to the invention, an assembly is provided in which the panel always experiences a rather consistent slide force, which will lead to reproducible results.

Although it is possible, that the two opposite parallel lateral edges of the panel themselves directly cooperate with the guides, in one embodiment of the assembly according to the invention the contact points are defined on tabs extending from the respective edges of the panel. Thus, at each respective lateral edge, three tabs are defined. In total, the panel comprises six tabs.

Said tabs can be realized in many ways. For example, the tabs can comprise extensions of or projections from the respective parallel lateral edges of the panel, attached thereto in any appropriate manner, or the tabs may be the result of the provision of recesses in the respective edges.

In still a further embodiment of the assembly according to the invention, the guides each are provided with two opposing guide surfaces positioned at a distance between them that is larger than the corresponding thickness of the tabs positioned between said opposing guide surfaces. The tabs near the ends of one edge engage the same guide surface of the guide, whereas the intermediate tab engages the other guide surface of the guide. As a result, the influence of dimensional variations on the experienced frictional forces is further minimized.

For obtaining the desired effect, only the respective edges of the panel have to be curved in one embodiment. However, it is also possible that the panel is curved in its entirety. This enables a simple manufacture of the panel.

The assembly according to the present invention can be provided in an open roof assembly for a vehicle, with a roof opening defined in the fixed roof of the vehicle and a movable closure element for opening and closing said roof opening, wherein the panel according to the present invention defines a sunshade.

In a second aspect, the present invention relates to a sunshade for application in an assembly according to the present invention.

In a third aspect, the present invention relates to a sunshade, in one embodiment, (but not necessarily) as set forth above, having a main body manufactured from a glass-reinforced composite material with a substrate layer and a foam layer and covered on one side by a cloth, wherein at least at the contact points the composite material is compressed in such a manner that the cloth ends laterally at or in the immediate vicinity of the substrate. Not only is such an embodiment of the sunshade helpful in further minimizing variations of the frictional forces due to dimensional variations, but it also reduces disturbing noises which otherwise would occur as a result of the engagement of the lateral foam layer edge with the corresponding guide.

Further, it is possible that the composite material ends laterally in a substantially sharp edge.

In one embodiment, the sunshade is manufactured from a high performance thermoplastic material, such as that made by Azdel®, Inc. of Shelby, N.C.

BRIEF DESCRIPTION OF THE DRAWINGS

Hereinafter the invention will be elucidated referring to the drawings, in which embodiments thereof are illustrated.

DETAILED DESCRIPTION OF THE PREFERRED EMBODIMENTS

Figure 1:
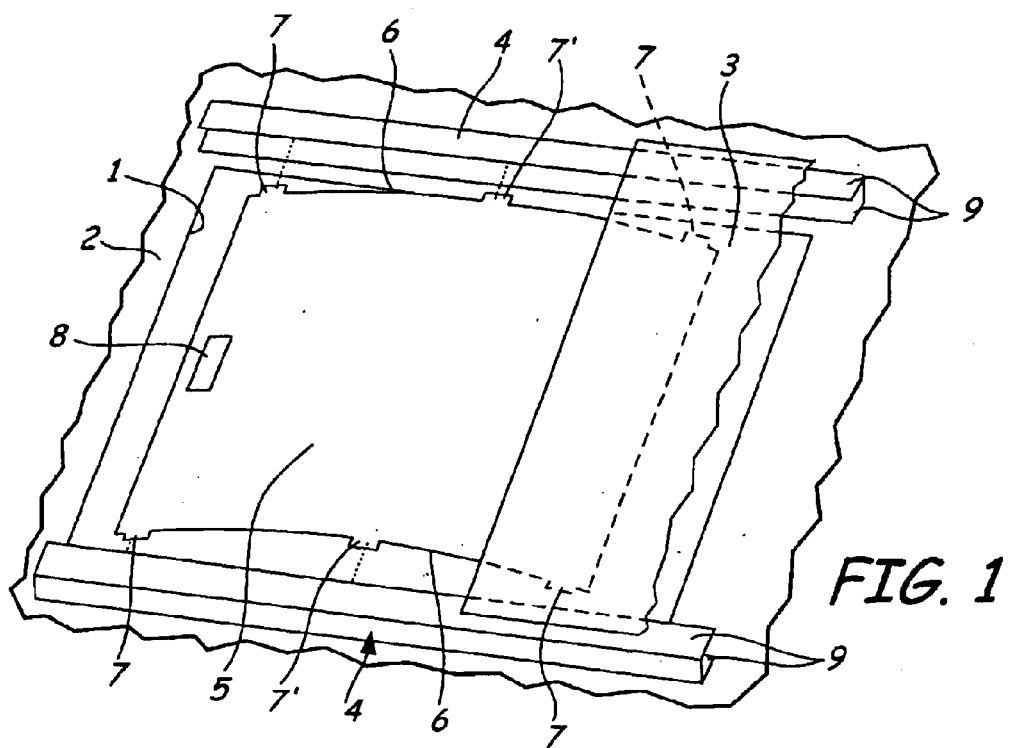
FIG. 1 shows, schematically and partly disassembled, an embodiment of an open roof assembly for a vehicle.

Referring to FIG. 1, there is schematically shown an open roof assembly for a vehicle. A roof opening 1 is defined in the fixed roof 2 of the vehicle and a movable closure element 3 is provided for opening and closing said roof opening 1. The closure element 3 cooperates in a manner well-known known (but not shown) with guides (shown neither) extending along (as seen in the direction of movement of the vehicle) transversal edges of the roof opening 1.

The open roof assembly further is provided with two opposing parallel guides 4 (which, are illustrated with an exaggerated spacing for purposes of understanding) which also extend along the said transversal edges of the roof opening 1. A panel 5, such as for example a sunshade, is provided with two opposite parallel lateral edges 6 with each edge 6 having three tabs 7 extending from the respective edges 6 of the panel 5.

The tabs 7 cooperate with the guides 4 for a frictional sliding movement of the panel 5 relative to the guides 4, for example when a driver of the vehicle manually engages a gripping recess 8 in the panel 5.

Figure 2:
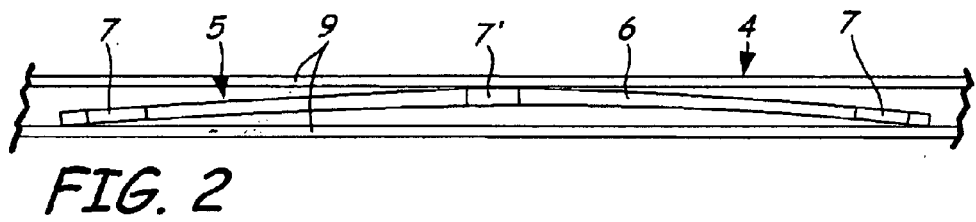
FIG. 2 shows, schematically and in an elevational view, the cooperation between a panel and a guide.

Also referring to FIG. 2, in a further embodiment, each guide 4 is provided with two opposing guide surfaces 9. The panel 5 has a thickness which, at least in its edge region, is smaller than the distance between the guide surfaces 9 of the guides. Further, as clearly shown in FIGS. 1 and 2, the panel 5 is curved such, that (as appears from FIG. 2) there are defined three contact points between each edge 6 (that is, the tabs 7 thereof) and a corresponding guide 4. In this embodiment, the shape of (the edge of) the panel 5 and its resiliency maintain the engagement between the tabs 7 and the guide 4 (i.e. the guide surfaces 9 thereof).

When a lateral edge 6 of the panel 5 is introduced into a guide 4 with its tabs 7, due to the curved shape of the panel 5, the two tabs 7 near the ends of an edge 6 will engage the same guide surface 9, for example in FIG. 2 the lower guide surface 9, whereas the intermediate tab 7' will engage the other guide surface 9, i.e. in FIG. 2 the upper guide surface 9. As appreciated, in an alternative embodiment, the tabs 7 could engage the upper guide surface 9 with the intermediate tab 7' engaging the lower guide surface 9.

Such a cooperation between the tabs 7, 7' of the panel 5 and the guide 4 (in this embodiment the guide surfaces 9 thereof) results in a frictional force between the panel 5 and the guide 4 which is substantially independent from dimensional or shape variations of the panel 5.

Although in the illustrated embodiment tabs 7 are provided, the curved edge 6 itself also might engage the guide 4, which then again results in three contact points with the same effect on the frictional force.

In the illustrated embodiment, the panel 5 is curved in its entirety. However, it is also conceivable that the panel 5 is substantially flat, whereas tabs 7 are provided which are positioned as discussed above to engage the opposed guide surfaces 9, which can be considered as along a curved line.

Figure 3:
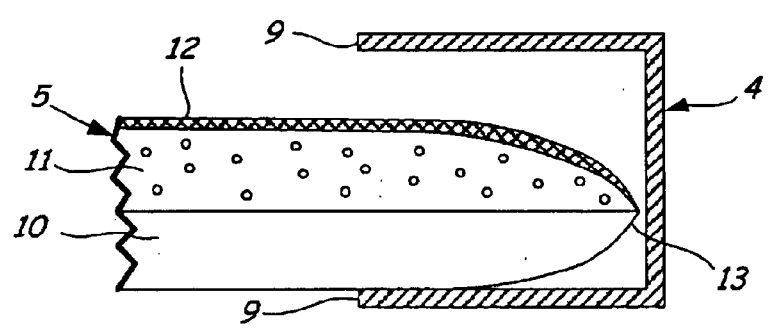
FIG. 3 shows, in a cross section, the cooperation between the edge of a special embodiment of the panel and a guide.

Referring now to FIG. 3, a cross section through a panel or sunshade 5 at a lateral edge 6 or tab 7 thereof is shown, together with a guide 4. The panel 5 can comprise a main body manufactured from a glass-reinforced composite material with a substrate layer 10, a foam layer 11 and a cloth 12 covering one side of the main body (in this example, the foam layer 11). The shown part of the panel 5 defines a contact point with a guide 4, and at this contact point the composite material is compressed in such a manner that it ends laterally in a substantially sharp edge 13. The cloth 12 extends up to and ends at said sharp edge 13.

As a result, there will be no or hardly any contact between the foam layer 11 and the guide 4, thus substantially reducing the creation for disturbing noises.

In one embodiment, the composite material is a high performance thermoplastic material such as Azdel®.

The invention is not limited to the embodiments described before, which may be varied widely within the scope of the invention as defined by the appending claims.

Although the present invention has been described with reference to preferred embodiments, workers skilled in the art will recognize that changes may be made in form and detail without departing from the spirit and scope of the invention.

What is claimed is:

1. An assembly comprising:
   two opposing guides, each having parallel guide surfaces; and
   a panel having two opposite lateral edges co-operating with said guides for a frictional sliding movement of the panel relative to the guides, wherein portions of said edges of the panel are resiliently positioned along a curved line such that there are defined three points of contact between each edge and the corresponding guide surfaces, wherein each portion forming a point of contact engages only one of the guide surfaces of the corresponding guide.

2. The assembly according to claim 1, wherein the contact points are defined on tabs extending from the respective edges of the panel.

3. An assembly comprising:
   two opposing parallel guides; and
   a panel having two opposite parallel lateral edges co-operating with said guides for frictional sliding movement of the panel relative to the guides, wherein portions of said edges of the panel are resiliently positioned along a curved line such that there are defined three points of contact between each edge and corresponding guide, wherein the points of contact are defined on tabs extending from the respective edges of the panel, wherein the guides each are provided with two opposing guide surfaces positioned at a distance which is larger than the corresponding thickness of the tabs positioned between said opposing guide surfaces, and wherein tabs near the ends of one edge engage the same guide surface, whereas an intermediate tab engages the other guide surface.

4. The assembly according to claim 3, wherein the panel is curved in its entirety.

5. An assembly comprising:
   two opposing parallel guides; and
   a panel having two opposite parallel lateral edges co-operating with said guides for a frictional sliding movement of the panel relative to the guides, wherein portions of said edges of the panel are resiliently positioned along a curved line such that there are defined three points of contact between each edge and corresponding guide, wherein the panel includes a main body manufactured from a glass-reinforced composite material with a substrate layer and a foam layer and covered at one side by a cloth, wherein at least at the points of contact the composite material is compressed in such a manner that the cloth ends laterally at or in the immediate vicinity of the substrate.

6. The assembly according to claim 5, wherein the composite material ends laterally in a substantially sharp edge.

7. The assembly according to claim 5, wherein the material comprises Azdel®.

8. The assembly of claim 2, wherein the guide surfaces are positioned at a distance which is larger than the corresponding thickness of the tabs.

* * * * *